No. 661,857. Patented Nov. 13, 1900.
A. DE VILBISS, Jr.
UNSCREWING DEVICE.
(Application filed Apr. 27, 1900.)
(No Model.)
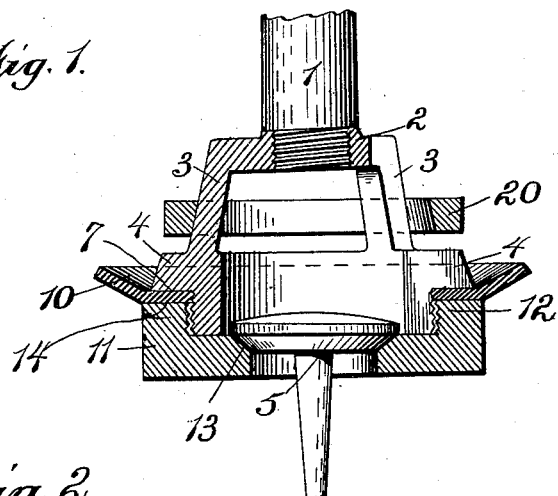
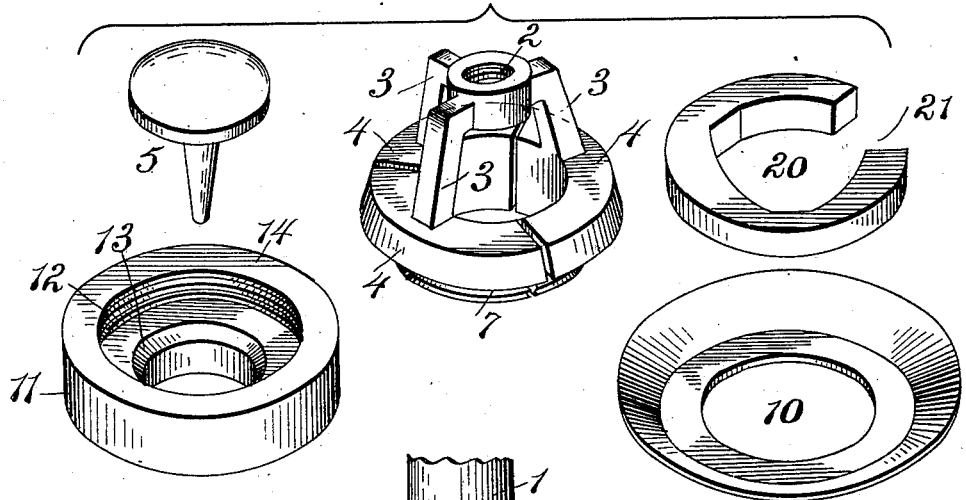
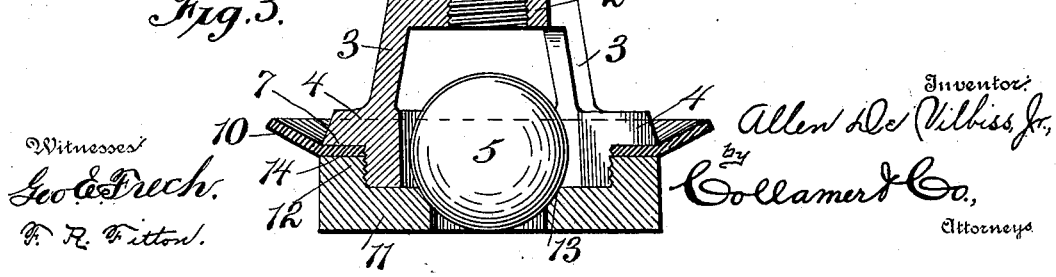
Witnesses
Geo. E. Frech.
F. R. Fitton.
Inventor
Allen De Vilbiss, Jr.
by Collamer & Co.,
Attorneys

UNITED STATES PATENT OFFICE.

ALLEN DE VILBISS, JR., OF TOLEDO, OHIO.

UNSCREWING DEVICE.

SPECIFICATION forming part of Letters Patent No. 661,857, dated November 13, 1900.

Application filed April 27, 1900. Serial No. 14,578. (No model.)

*To all whom it may concern:*

Be it known that I, ALLEN DE VILBISS, Jr., a citizen of the United States, and a resident of Toledo, Lucas county, State of Ohio, have invented certain new and useful Improvements in Unscrewing Devices, (Case O;) and my preferred manner of carrying out the invention is set forth in the following full, clear, and exact description, terminating with claims particularly specifying the novelty.

This invention relates to pumps, and more especially to the pistons used therein; and the object of the same is to produce means for disconnecting the parts (as in a sucker-pump) which hold the washer in place. In the usual construction there is a cage or frame connected with the lower end of the pump-rod and containing a valve, and to the lower extremity of this cage is screwed a ring, between which and said extremity is clamped the inner edge of a leather or other washer. The entire device is reciprocated by the pump-rod within the bore of the pump, and it is well known to those who are familiar with this art that when it is desired to remove or replace a worn or damaged washer it is often very annoying to find that the members which were screwed together have become so rusted as to be practically inseparable.

The object of the present invention is to avoid this difficulty and to make the members readily separable, to which end the invention consists in constructing the cage of a ring split into a number of pieces, each of which is attached to one arm of a spider whose hub is connected to the pump-rod, and in using a drive-ring which is forced down upon these arms, so as to draw the pieces of the ring inward wholly or at least partially out of threaded engagement with a boss formed upon a solid ring which constitutes the valve-seat, all as hereinafter more fully described and claimed, and as illustrated in the accompanying drawings, wherein—

Figure 1 is a sectional view of one form of this invention with all parts connected and the drive-ring in place. Fig. 2 is a perspective detail of the parts separated, showing a slightly-modified form of the drive-ring. Fig. 3 is a section of the invention wherein the valve is of the globular type, and this view omits the drive-ring.

In the said drawings, 1 is the pump-rod, connected, as by threads, to the hub 2 of a spider, whose arms 3 diverge slightly on their outer edges toward their lower ends, which latter are connected with the arc-shaped pieces 4 of a split ring forming the base of the cage for containing the valve 5. The latter is shown of disk shape in Fig. 1 and globular in Fig. 3; but it is evident that a flap-valve could be used or one of other form.

11 is the clamping-ring, having at its center a valve-opening and valve-seat 13. This ring is solid—that is, it is not split—and it is provided with an annular integral boss 12, threaded on its inner face to engage threads on the outer faces of the pieces 4 of the split ring.

10 is a washer, as of leather, its diameter being greater than that of either ring. Its inner edge is clamped between a downwardly-facing shoulder 7, formed on the exterior of the pieces constituting the split ring and the upper end 14 of said boss, and the length of the parts which are in threaded engagement is such that this clamping action will occur before the extremities of the pieces 4 strike upon the body 11 of the clamping-ring.

20 is a drive-ring of stouter metal than that comprising the remainder of the device. Usually this ring is solid—that is, it is not split; but in Fig. 2 it is shown with one side broken out, so as to leave an opening 21 of sufficient width to pass astride the pump-rod 1. This may necessitate making this drive-ring a little heavier than if it were solid throughout; but it permits the lateral application of this ring to the device and its removal therefrom without disconnecting the pump-rod from the hub 2.

With this construction the parts are assembled in a manner which will be clear and the device is employed as usual. When it is desired to disconnect the threaded rings and they are found to have become rusted together, the drive-ring is brought down into engagement with the outer edges of the arms 3 and driven downward thereon slightly, which causes said arms to be approximated and results in the forcible breaking of the rust, after which the clamping-ring may be unscrewed from the split ring in a manner which will be clear.

I do not limit myself to any particular form of valve or to a drive-ring necessarily entirely solid, although it should not yield when in use, and it is clear that other devices might be substituted for the drive-ring, such as any ordinary hammer or a vise whose proper use might press the pieces of the split ring inward sufficiently to break the rust; nor do I confine myself to the use of this device solely in pumps, as it will be clear that the same will have great utility where any two members are to be separated which might be rusted together.

What is claimed as new is—

1. In a piston, the combination with a solid ring having inwardly-facing threads; of a split ring whose pieces have outwardly-facing threads adapted to engage those on the solid ring, and a spider whose arms normally spring outward and are connected with said pieces.

2. In a piston, the combination with a solid ring having an integral annular boss threaded on its inner face; of a split ring whose pieces are threaded on their outer faces and adapted to engage said boss and have shoulders of larger diameter than the threads, means for spreading the pieces radially outward, and an annular washer clamped between the face of the shoulder and the flat end of the boss.

3. In a piston, the combination with a spider having diverging arms which normally spring outward, and a ring split into pieces respectively connected to the ends of the arms and each threaded for a distance on its outer face and having a longitudinally-facing shoulder larger than the threads; of a solid ring having a boss threaded on its interior to engage the threads on said pieces, a washer clamped between the boss of the solid ring and the shoulder of the split ring, and a drive-ring adapted to be forced onto said diverging arms to loosen the engagement of the threads.

4. In a pump-piston, the combination with the pump-rod, a spider attached thereto and having diverging arms which normally spring outward, and a ring split into pieces respectively connected to the ends of the arms and each threaded on its outer face; of a solid ring threaded on its interior to engage the threads on said pieces, a valve in this ring working within the spider, a washer clamped between the solid ring and the split ring, and a drive-ring adapted to be forced onto said diverging arms to loosen the engagement of the threads.

5. In a pump-piston, the combination with the pump-rod, a spider attached thereto and having diverging arms which normally spring outward, and a ring split into pieces respectively connected to the ends of the arms and each threaded for a distance on its outer face and having a longitudinally-facing shoulder larger than the threads; of a solid ring having a boss threaded on its interior to engage the threads of said pieces, a valve in this ring working within the spider and within the split ring, a washer clamped between the boss of the solid ring and the shoulder of the split ring, and a drive-ring adapted to be forced onto said diverging arms to loosen the engagement of the threads.

6. In a piston, the combination with a spider comprising a hub, obliquely-diverging arms leading therefrom, arc-shaped pieces carried thereby and constituting members of a split ring, shoulders on said pieces, a clamping-ring having a boss in threaded engagement with said arc-shaped pieces, and a washer whose inner edge is clamped between the shoulders and boss; of an axial rod connected with said spider, and a drive-ring of a size to surround said arms closely, this ring having an opening of a size to pass astride said rod.

7. In a piston, the combination with a spider comprising a hub, obliquely-diverging arms leading therefrom, arc-shaped pieces carried thereby and constituting members of a split ring, a clamping-ring in threaded engagement with said arc-shaped pieces, and a washer whose inner edge is clamped between the split and clamping rings; of an axial rod connected with said spider, and a drive-ring of a size to surround said arms closely, this ring having an opening of a size to pass astride said rod.

8. In a pump-piston, the combination with the pump-rod, a spider attached thereto and having diverging arms which normally spring outward, and a ring split into pieces respectively connected to the ends of the arms and each threaded on its outer face; of a solid ring threaded on its interior to engage the threads on said pieces, a valve in this ring working within the spider, a washer clamped between the solid ring and the split ring, and a drive-ring adapted to be forced onto said diverging arms to loosen the engagement of the threads, this ring having an opening of a size to pass astride said pump-rod.

9. In a piston, the combination with the pump-rod, a spider attached thereto and having diverging arms which normally spring outward, and a ring split into pieces respectively connected to the ends of the arms and each threaded for a distance on its outer face and having a longitudinally-facing shoulder larger than the threads; of a solid ring having a boss threaded on its interior to engage the threads on said pieces, a washer clamped between the boss of the solid ring and the shoulders of the split ring, and a drive-ring adapted to be forced onto said diverging arms to loosen the engagement of the threads, this ring having an opening of a size to pass astride said pump-rod.

In testimony whereof I have hereunto subscribed my signature this the 23d day of April, A. D. 1900.

ALLEN DE VILBISS, Jr.

Witnesses:
 JAMES R. SMITH,
 MORRIS WELT.